United States Patent [19]
Beery et al.

[11] 3,751,025
[45] Aug. 7, 1973

[54] CONICAL SPRING
[75] Inventors: Jack Beery, Farmington; Zong S. Luo, Plymouth, both of Mich.
[73] Assignee: Burroughs Corporation, Detroit, Mich.
[22] Filed: Nov. 1, 1971
[21] Appl. No.: 194,704

[52] U.S. Cl.............................. 267/166, 267/180
[51] Int. Cl............................................... F16f 1/06
[58] Field of Search.................. 267/180, 177, 168, 267/170, 171, 174, 175, 178, 166; 5/256

[56] References Cited
UNITED STATES PATENTS
2,650,617  9/1953  Wasser............................. 267/180
1,963,054  6/1934  Powers................................. 5/256
3,127,147  3/1964  Spangenberg..................... 267/177

Primary Examiner—James B. Marbert
Attorney—Paul W. Fish and Edwin W. Uren

[57] ABSTRACT

A conical spring is provided wherein the diameters of the coils thereof vary progressively, and the spaces separating adjacent coils vary in relation to the dimensions of the coils to provide predetermined force-displacement spring characteristics.

2 Claims, 3 Drawing Figures

PATENTED AUG 7 1973

3,751,025

INVENTORS
JACK BEERY
ZONG S. LUO

CONICAL SPRING

BACKGROUND OF THE INVENTION

The invention relates to helical springs in general and more particularly to conically shaped springs.

Prior art discloses springs having restoring forces which vary unpredictably with respect to changes in spring displacement within their respective operating ranges. The designs of many of these springs have substantially empirical histories, having often been designed only to exert some minimum restoring force in response to some arbitrary displacement or to provide restoring forces within some maximum range of values in response to displacement within certain limits.

SUMMARY OF THE INVENTION

The invention resides in the provision of a conical spring design which embraces specific relationships between the physical dimensions, disposition and characteristics of a spring material to predetermine the restoring force which will be exerted by the spring in response to any given displacement thereof.

Accordingly, it is an object of the present invention to provide a conical spring having a restoring force which is a mathematically determinable function of any given displacement of the spring.

An important aspect of the invention is the use of a conical spring design which relates specific physical factors of spring construction to provide a spring having predetermined force-displacement characteristics.

BRIEF DESCRIPTION OF THE DRAWINGS

These and other objects, aspects and advantages of the invention will be more clearly understood from the following description when read in conjunction with the accompanying drawings, in which.

DETAILED DESCRIPTION OF THE INVENTION

Figure 1:
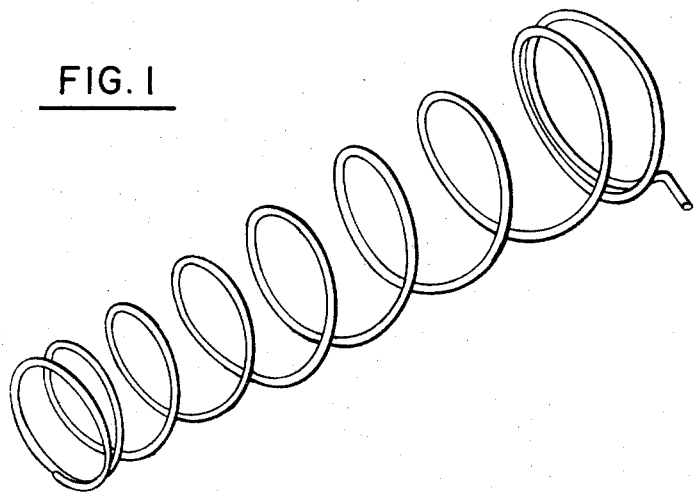
FIG. 1 is an enlarged, perspective view of a conical spring embodying features of the invention.
Figure 2:
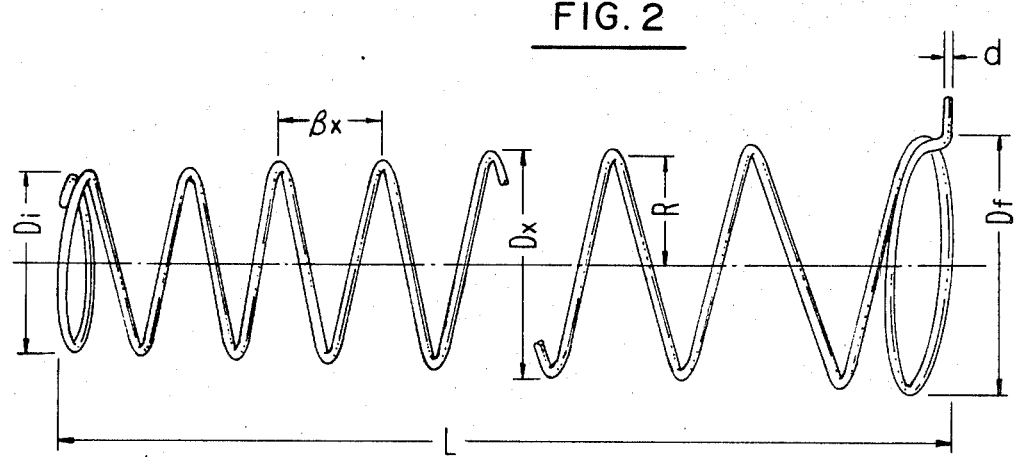
FIG. 2 is an enlarged, side view of the conical spring of FIG. 1 and includes reference symbols pertinent to the mathematical equations described and developed within the specification.

The conical spring shown by FIGS. 1 and 2 has a series of resilient coils which are mutually adjacent and coaxially disposed. As illustrated, the coils have progressively varying diameters so that they collectively form a conical spring. As also shown, the spaces separating adjacent coils of the spring are varied in relation to the dimensions of the coils.

A more rigorous description of the spring and its characteristics is provided by reference to mathematical notation. From the book titled Strength of Materials, by S. Timoshenko, the axial, longitudinal, deflection of a helical spring may be expressed by the equation $$\delta = \int_0^{2\pi n} \frac{PR^3}{GI_p} d\alpha, \qquad [1]$$

wherein $n$ represents the number of coils, $P$ represents the shearing force, $R$ represents the mean radius of a cylindrical surface containing the center line of the spring, $G$ represents the modulus of elasticity in shear of the spring material, $I_p$ represents the polar moment of inertia of a circular cross section of the spring and is equal to $\pi d^4/32$, $d$ representing the diameter of the spring material, and $\alpha$ represents the angle of twist of an element between two adjacent cross sections of the spring. If $L/\alpha$, where L represents the active free length of the spring and $\beta$ represents the average distance between adjacent coils, is substituted for n in the Timoshenko equation [1] and $\pi d^4/32$ is substituted for $I_p$, the equation becomes $$\delta = \int_0^{2\pi L/B} \frac{32 PR^3}{\pi d^4 G} d\alpha, \qquad [2]$$

which when integrated, becomes $$\delta = 64 PR^3 L/d^4 G \beta. \qquad [3]$$

The bulk modulus of elasticity of a spring is given by the equation $$K = P/\delta/\delta. \qquad [4]$$

Since the equation [3] defining axial elongation of the spring has previously been derived, it may be substituted for $\delta$, yielding the equation $$K = d^4 G \beta / 64 L R^3. \qquad [5]$$

The radius $R$, previously defined as being the mean radius of a cylindrical surface containing the center line of the spring, may also be defined by the equation $$R = \tfrac{1}{2}(D_x - d), \qquad [6]$$

wherein $D_x$ represents the outside diameter of the spring at a point along its axis. The cube of this would be $$R^3 = d^3/8[(Dx/d)-1]^3; \qquad [7]$$

and, since the spring index $C$ is defined as $$C = X/d, \qquad [8]$$

then $$R^3 = d^3/8(C-1)^3. \qquad [9]$$

Substituting this equation [9] for $R^3$ in the equation [5] for the bulk modulus of elasticity would yield the equation $$K = dG\beta/8L(C-1)^3. \qquad [10]$$

The outside diameter of the spring at a point along its longitudinal axis may be defined by the equation $$Dx = Di + (Df-Di/L)x, \quad [11]$$

wherein $D_i$ represents the smallest outside diameter of the spring, $D_f$ represents the largest outside diameter of the spring and $x$ represents some point along the longitudinal axis of the spring, its value being between or including 0 and that of $L$. The parenthesized portion of this equation represents the rate of change of the diameter of the spring with respect to its axial length.

Solving the equation [10] of the bulk modulus of elasticity for $B$ would yield the equation $$\beta_x = 8LK/dG(C_x-1)^3, \quad [12]$$

wherein the notation $\beta_x$ has been used in place of $\beta$ to represent variable coil pitch, which is the distance between adjacent coils at some point $x$ along the longitudinal axis of the spring. The notation $C_x$ has been used in place of $C$ to represent a variable spring index, and it identifies $C$ as being a function of some point $x$ along the longitudinal axis of the spring at which the equation is to be applied. Since the variable $C_x$ has been substituted for $D_x/d$, it may be more rigorously defined by substituting therein the mathematical definition of $D_x$ to obtain the equation $$C_x = Di/d + (Df-Di)/dL \; x. \quad [13]$$

It may be observed at this point that the last two equations [12 and 13] represent a means for determining the physical parameters of a conical spring having a length equal to the sum of the variable coil pitches $\beta_x$. If a spring having a different, specific length is required, the following equation may also be solved to determine the actual distance between adjacent coils at a particular point $x$ along the longitudinal axis of the spring, that is, to determine the true pitch $\beta_x$:

$$B_x = \beta_x + \left(L - \sum_{x=1}^{n} B_x\right) \frac{\beta_x}{\sum_{x=1}^{n} \beta_x}, \quad (14)$$

wherein the parenthesized portion of this equation represents the difference between the desired, active free length of the spring and the length resulting from summing the variable coil pitches. The ratio following the parenthesized portion indicates what percentage of the aforementioned difference need be added to the variable coil pitch $\beta_x$ to obtain the true pitch $B_x$, the sum of which will be the desired free length.

Figure 3:
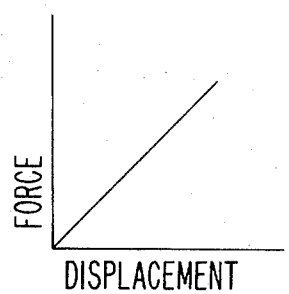
FIG. 3 is a graph illustrating the relationship between the restoring force and the displacement of a typical spring constructed according to this invention.

The last three equations [12, 13 and 14], then, represent a means for determining the parameters of a conical spring having physical characteristics as desired. A typical design application would be one where the restoring force of a spring is to be a linear function of its displacement, as shown by FIG. 3, although these equations are applicable to many other design requirements. As in any mathematically defined method for design, appropriate known values may be applied to the equations and desired but unknown design information derived upon their solution.

While the conical spring has been shown and described in considerable detail, it should be understood that many changes and variations may be made therein without departing from the spirit and scope of the invention.

What is claimed is:

1. A conical spring having a series of mutually adjacent, coaxially disposed, resilient coils of progressively varying diameters, said spring providing predetermined restoring force characteristics relative to applied displacement forces as determined by the physical dimensions and disposition of said coils and by the characteristics of the materials forming said coils, said predetermined restoring force characteristics relative to said applied displacement forces being derived from the formation and disposition of said coils according to the equation $$B_x = 8LK/dG \; (C_x-1)^3 \text{ AND } C_x = Di/d + (D_f-D_i)/dL \; x,$$

$B_x$ representing the variable coil pitch, $K$ representing the bulk modulus of elasticity of the spring material, $G$ representing the modulus of elasticity in shear of the spring material, $L$ representing the active free end of the spring material, $C_x$ representing a variable spring index, $d$ representing the diameter of the spring material, $D_i$ representing the smallest outside diameter of the spring, $D_f$ representing the largest outside diameter of the spring, and $x$ representing a variable of length designating longitudinal position along the axis of the spring.

2. The conical spring as defined by claim 1 wherein said predetermined restoring force characteristics relative to applied displacement forces as determined by the physical dimensions and disposition of said coils are derived by the formation of said coils according to the equation $$B_x = B_x + \left(L - \sum_{x=1}^{n}\right) \frac{B_x}{\sum_{x=1}^{n} B_x},$$

$L$ representing the active free length of the spring material, and $B_x$ representing the true coil pitch, whereby the sum of the individual values of true coil pitch will be equal to the active free length of the spring.

* * * * *

UNITED STATES PATENT OFFICE
CERTIFICATE OF CORRECTION

Patent No. 3,751,025                     Dated August 7, 1973

Inventor(s) Jack Beery et al.

It is certified that error appears in the above-identified patent and that said Letters Patent are hereby corrected as shown below:

Column 2, line 8, "L/a" should read -- $L/\beta$ --; line 26, "K = P/$\delta$/$\delta$" should read -- $K = P/\delta$ --; line 52, "C =X/d" should read -- $C = D_x/d$ Signed and sealed this 8th day of January 1974.

(SEAL)
Attest:

EDWARD M. FLETCHER, JR.　　　　　　RENE D. TEGTMEYER
Attesting Officer　　　　　　　　　　Acting Commissioner of Patents